March 8, 1932. L. F. MOODY 1,848,739

HYDRAULIC TURBINE

Original Filed June 25, 1920

INVENTOR
LEWIS FERRY MOODY
BY Edwards, Lager & Bower
his ATTORNEYS.

Patented Mar. 8, 1932

1,848,739

UNITED STATES PATENT OFFICE

LEWIS FERRY MOODY, OF PHILADELPHIA, PENNSYLVANIA

HYDRAULIC TURBINE

Original application filed June 25, 1920, Serial No. 391,583. Divided and this application filed March 29, 1926. Serial No. 98,082.

This invention relates to hydraulic turbines and particularly to turbines of high specific speed through which large quantities of water flow at high velocity head compared to the net head on the plant, and to turbines having wicket gate or movable guide vane means for regulating the flow.

The object of the invention is to provide a turbine installation in which large quantities of water can be handled within a limited space, and within which the water can be set into motion at high velocity and again retarded to a low velocity at discharge with minimum loss of head, and may impart to the turbine runner a high velocity of rotation; and it is at the same time an object of the invention to provide such a turbine with an operating mechanism for controlling the power and speed, so arranged that the working parts are readily accessible outside of the water passages while the turbine is in operation.

Another object of the invention is to provide a turbine in which the intake and outflow passages and the control means are adapted to produce a whirling body of water within which the runner rotates at high speed, and to decelerate the velocity of whirl in a draft tube spreading outward away from the turbine axis on all sides, so as efficiently to regain the kinetic energy of the water leaving the runner.

Still another object of the invention is to provide a turbine in which the flow is upward with the outflow passage above the intake, and in which the movable guide vanes in the intake are operated from above.

The turbine to which the specific features of this invention are particularly adapted is one having a propeller type runner, that is, an unshrouded diagonal flow runner having a small number of vanes thereby giving a high efficiency which is due in part to the relations existing between the surface friction and blade area. In order to enable such a runner to operate at high velocity the draft tube of the turbine of this invention expands radially at its discharge end to a diameter considerably greater than that of the runner, so that the water may leave the runner with a considerable velocity of whirl, this whirl being efficiently decelerated and the water leaving the discharge end of the draft tube at low velocity.

Further objects of the invention particularly in the arrangement of the turbine units and passages in the power house will appear from the following description taken in connection with the accompanying drawings in which.

Figure 1:
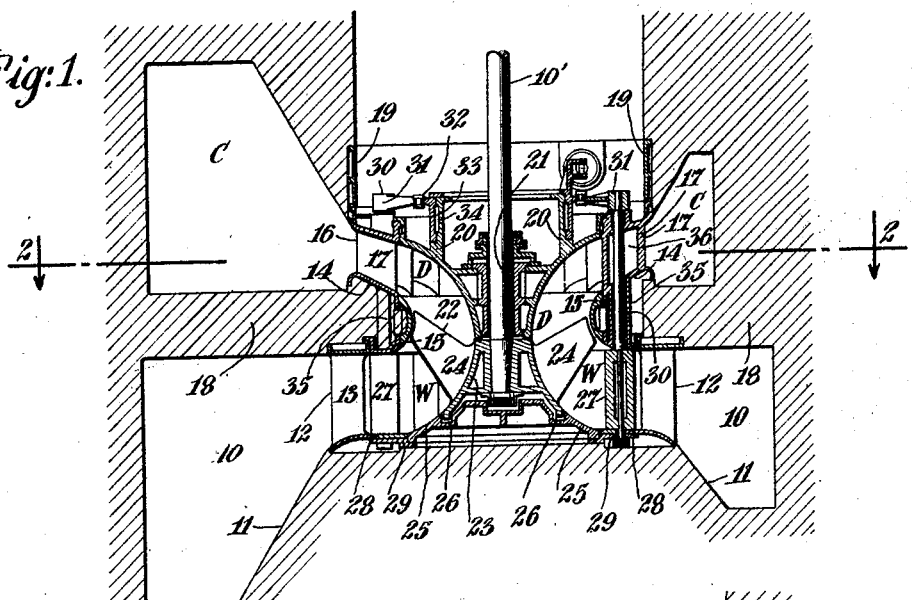
Fig. 1 is a vertical sectional view of a turbine installation showing one embodiment of the invention.
Figure 2:
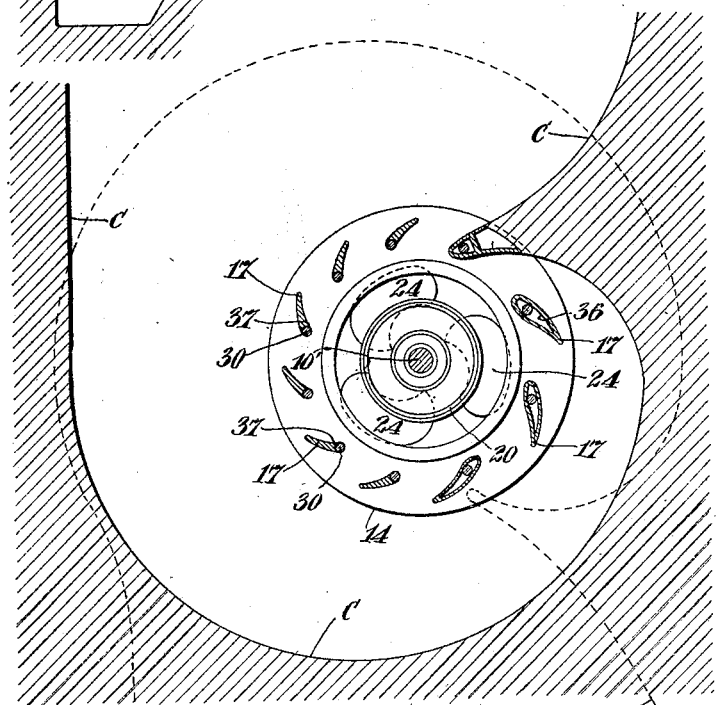
Fig. 2 is a horizontal sectional view taken on line 2—2 of Fig. 1.

In the embodiment of the invention illustrated the intake passage 10 is below the outflow passage C, the flow being upward. The intake passage 10 surrounds a central base 11 of frusto-conical form capped at the top by the speed ring 12, having stay vanes 13. Supported on the speed ring 12 is the upper ring 14 comprising a casing having a lower part 15 forming the outer wall of the water passage W and draft tube D, and an upper part forming the upper stay vane ring 16 having its vanes 17 in the discharge. The speed ring 12 and upper ring 14 form a continuous columnar support sustaining at an intermediate point the partition 18 between the intake and outflow passages and carrying at the upper end the pit liner 19 and the pit bottom 20 surrounding the vertical shaft 10' and forming the inner wall of draft tube D. The pit bottom 20 carries the bearing 21 for the shaft and just below this bearing is a runner 22 having a frusto-conical hub 23 and three diagonal blades 24 extending across the water passage W, and being of the diagonally inward flow type. That is, the blades along a radial or outwardly extending axis are disposed diagonally to the runner axis, while with respect to the transverse direction of the blade or in the direction of flow thereover the blades are disposed at a relatively small angle with respect to the plane of runner rotation, this being particularly noticeable near the peripheral portion of the blades. This relatively small angle is readily seen by observing in Fig. 1 that the axial extent of the blades is materially less than the circumferential extent shown in Fig. 2. Due to this difference in circumferential and axial extents the blade in the direction of flow thereover will be disposed at a small angle relative to the plane of runner rotation which is a plane normal to the runner axis. It will also be noted that the runner blades at their entrance and discharge edges are cut back near the peripheral portion thereof, thus giving a curved effect to the entrance and discharge edges in plan view. While the corners of the blades are thus cut back still the desirable degree of large blade area is maintained for supporting the column of fluid flowing through the runner. The elimination of this corner area of the blades is desirable due to the fact that the relative velocity between the flow and blades is greatest near the runner periphery and accordingly detrimental effects are more likely to show in this general area. The filling out of either one or both of the corners of each blade would not sufficiently increase the supporting area for the column of flow so as to overbalance the detrimental effects that might be effective on the small additional area at these corners. It will be further noted in the plan view of Fig. 2 that the circumferential extent of the runner blades is greater than the circumferential extent between the adjacent edges of adjacent blades, and also that the maximum diameter of the hub at the root of the blades is at least equal to approximately 60% of the throat portion of the passage, the throat being in that area of the passage where the runner tips are disposed. Also the mean diameter of the hub with respect to this throat area is at least approximately 45% thereby showing that the hub is relatively large. The runner thus formed rotates at a high speed under light torque and the discharge from it has a considerable velocity of whirl, the energy of which would be largely lost in the ordinary straight draft tubes adapted to regain only the axial components of the discharge. The plate 25 at the top of the conical base 11 completes the inner wall of the passage W and is channeled at 26 to receive a flange of the runner hub 23.

Adjacent the fixed vanes 13 of speed ring 12 are the adjustable guide vanes 27 movably mounted on annular plate 28 inset in the inward extension 29 of the speed ring 12. The stems 30 of the guide vanes 27 extend into recesses in the plate 28 and extension 29 and extend upwardly through the ring 14 and through the draft tube D, and at their upper ends carry levers 31 connected by links 32 to the operating ring 33 having a bearing on the cylindrical extension 34 of the pit bottom 20. The stems 30 are housed in sleeves 35 in the lower casing portion 15 of ring 14, and in the draft tube D they are passed through and housed in hollow stay vanes as indicated at 36 or are seated in recesses in the ends of the stay vanes 17 as shown at 37 and partially exposed to the flow.

This application is a division of the copending application of L. F. Moody, Serial No. 391,583, filed June 25, 1920 for hydraulic turbine, Patent No. 1,656,889, issued January 17, 1928, and is directed to the form shown in Fig. 3 of said patent.

I claim:

1. In a hydraulic turbine the combination with an intake, of a discharge, adjustable guide vanes in said intake, stay vanes in said discharge, and stems on said guide vanes passing through said discharge.

2. In a hydraulic turbine the combination with an intake, of a discharge, adjustable guide vanes in said intake, stay vanes in said discharge, said stay vanes having recesses, and stems on said guide vanes passing through said discharge and recesses of said stay vanes.

3. In a hydraulic turbine the combination with an intake, of a discharge above said intake, adjustable guide vanes in said intake, stay vanes in said discharge, and stems on said guide vanes passing upwardly through said discharge.

4. In a hydraulic turbine the combination with an intake, of a discharge above said intake, adjustable guide vanes in said intake, and stems on said guide vanes passing upwardly through said discharge.

5. In a hydraulic turbine the combination with an intake, of a discharge above said intake, adjustable guide vanes in said intake, hollow stay vanes in said discharge, and stems on said guide vanes passing upwardly through said hollow stay vanes.

6. In a hydraulic turbine of high specific speed the combination of guide vanes directing the flow with radial inward and tangential velocity components with respect to the turbine axis, a runner having blades with outer ends above said vanes and inner ends extending below the upper ends of said vanes, said blades being formed and spaced to leave open spaces between their outer portions when viewed in a plane perpendicular to the axis and providing a transition space between said guide vanes and said runner blades.

7. In a hydraulic turbine of high specific speed the combination of guide vanes directing the flow with radial inward and tangential velocity components, a runner having not more than three blades with outer ends above said vanes and inner ends extending below the upper ends of said vanes, said blades being formed and spaced to leave open spaces between their outer portions when viewed in a plane perpendicular to the axis and providing a transition space between said guide vanes and said runner blades.

8. In a hydraulic turbine of high specific speed the combination with a water passage having a radially directed entrance portion and an axially directed discharge portion, of guide vanes in said entrance portion adapted to impart a whirl to the flow, and a runner between said portions spaced from said guide vanes by an intermediate transition space, and having no more than three unshrouded blades with outer ends above said vanes and inner ends extending below the upper ends of said vanes.

9. In a hydraulic turbine of high specific speed the combination with a water passage having a radially directed entrance portion and an axially directed discharge portion above said entrance portion, of guide vanes in said entrance portion adapted to impart a whirl to the flow, and a runner between said portions, spaced from said guide vanes by an intermediate transition space, and having not more than three unshrouded blades which near their peripheral portion in plan view have a circumferential extent greater than that between adjacent edges of adjacent blades.

10. In a hydraulic turbine the combination with an intake, of a discharge, adjustable guide vanes in said intake, stay vanes in said discharge, and stems on said guide vanes passing through said discharge adjacent said stay vanes.

11. In a hydraulic turbine the combination with an intake passage and a discharge space and a runner therebetween, of adjustable guide vanes in said intake passage, and stems for said adjustable guide vanes passing through said discharge space.

12. In a hydraulic turbine the combination with an intake passage and a draft tube of the conical diverging type, of movable guide vanes in said intake with stems passing through said draft tube and operated by mechanism located on the draft tube side of the turbine.

13. In a hydraulic turbine the combination with an intake passage of a runner receiving the flow therefrom, a spreading draft tube receiving the discharge from said runner, a discharge passage receiving the flow from said draft tube, and adjustable guide vanes in said intake passage with stems passing through said draft tube.

14. In a hydraulic turbine the combination with an intake passage, of a runner receiving the flow therefrom, a spreading draft tube receiving the discharge from said runner, a discharge passage receiving the flow from said draft tube, adjustable guide vanes in said intake passage with stems passing through said draft tube and operating means for said guide vanes in the foundation space surrounded by said discharge passage.

15. The combination in a turbine comprising a runner, a guide vane having a passage extending therethrough, means for controlling flow relative to the runner and for supporting said vane, including a casing and a rod extending through the passage in said guide vane, said vane and rod being adapted normally to have relative movement.

16. The combination in a turbine comprising a runner, a guide vane having a passage extending therethrough, means for controlling whirling flow relative to the turbine and for supporting said vane including a casing and a rod extending through the passage in said guide vane, and a bearing carried by said casing whereby said vane and rod are adapted to have relative movement.

17. In a turbine, a runner, a casing therefor, a guide vane disposed between the sides of said casing and having an axially extending passage, a rod extending through said passage and the sides of said casing, and means whereby said rod is operatively connected to said casing after passing through the casing sides.

18. In a turbine, a runner, a casing therefor, a guide vane disposed between the sides of said casing and having an axially extending passage, a rod extending through said passage and the sides of said casing, and enlarged elements operatively connecting said rod and the stationary part of the casing and being operatively connected to said rod at points beyond where said rod passes through the casing sides.

19. In a hydraulic turbine, the combination comprising intake and discharge passages, a runner therebetween, adjustable guide vanes in one of said passages, and stems for said adjustable guide vanes passing through the other of said passages.

20. The combination in a hydraulic turbine comprising a runner, a casing for conducting fluid relative thereto, and means disposed within the flow passage of said casing including a guide vane having a passage extending therethrough, and a rod disposed within said vane passage, said rod and vane being adapted normally to have relative movement therebetween.

LEWIS FERRY MOODY.